UNITED STATES PATENT OFFICE.

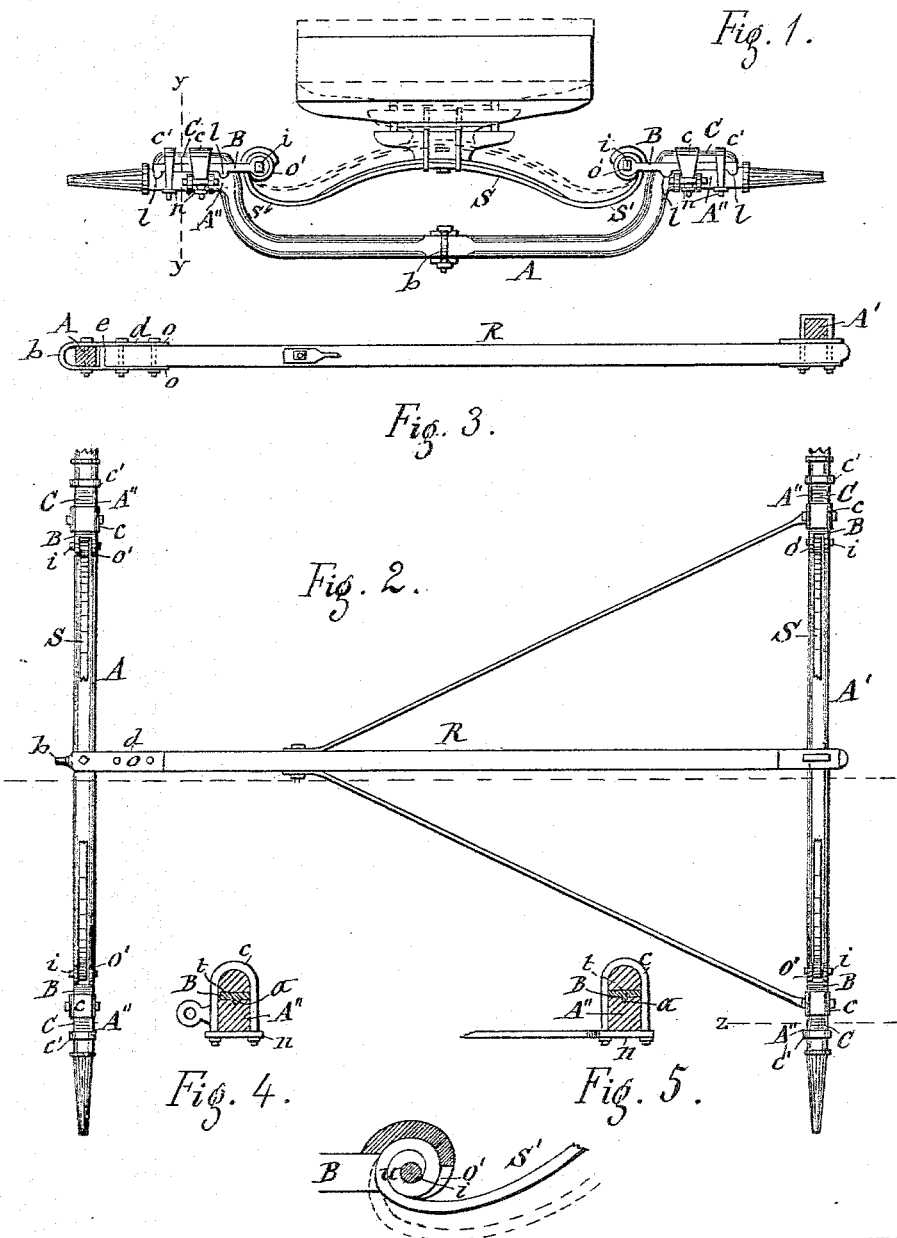

EDMUND H. CARPENTER, OF SYRACUSE, NEW YORK.

SPRING-VEHICLE.

SPECIFICATION forming part of Letters Patent No. 356,617, dated January 25, 1887.

Application filed October 23, 1886. Serial No. 217,006. (No model.)

*To all whom it may concern:*

Be it known that I, EDMUND H. CARPENTER, of Syracuse, in the county of Onondaga, in the State of New York, have invented new and useful Improvements in Spring-Vehicles, of which the following, taken in connection with the accompanying drawings, is a full, clear, and exact description.

This invention relates to the attachment of cross-springs to the axles of the vehicle, and has special reference to that class of vehicles which have the central or main portion of the axle depressed and the cross-spring hung on arms secured to the end portions of the axle.

The object of this invention is to hang the vehicle-body as low as possible on the vehicle, and at the same time allow increased play and elasticity to the cross-spring which supports the body; and to that end my invention consists in the combination of the axle formed with an abruptly downwardly-deflected main portion, horizontal projections from the end portions of the axle over the deflected portion of the axle and provided with shackle-eyes at their free ends, and the cross-spring having its end portions below the end portions of the axle and coiled upward between the aforesaid shackle-eyes and adjacent portions of the axle and connected directly to said shackle-eyes, all as hereinafter more fully described, and specifically set forth in the claims.

In the annexed drawings, Figure 1 is a front elevation of a vehicle, minus its wheels, and showing my improvements applied to the forward axle. Fig. 2 is a top plan view of the same, minus the body and subjacent parts. Fig. 3 is a longitudinal section on line $x\ x$, Fig. 2. Fig. 4 is a transverse section on line $y\ y$, Fig. 1. Fig. 5 is a transverse section in line $z\ z$, Fig. 2; and Fig. 6 is an enlarged detached sectional view of the connection of the spring with hanger arm or plate.

Similar letters of reference indicate corresponding parts.

A and A' represent, respectively, the forward and rear axles, which have their central or main portions depressed or deflected downward abruptly from the end portions thereof.

R denotes the reach which connects said axles. The forward end of the reach I connect to the forward axle by means of a coupling-link, $d$, which embraces the axle, and is formed in one piece with a brace, $b$, in front of the axle, with a tie, $e$, back of the axle, and with rearward-extended shanks $o\ o$, secured, respectively, to the top and bottom of the reach by bolts passing through said parts. The brace $b$, aside from strengthening the coupling-link, also serves as a safety-coupling, which prevents the said link from becoming entirely disconnected from the axle in case the king-bolt is broken. The tie $e$ serves as an abutment for the end of the wooden portion of the reach.

S denotes the cross-spring, the central or main portion of which is of the so-called "semi-elliptic" type. The end portions of the said spring I curve upward and reverse from the central portion, and terminate the same with coupling-eyes $u$, as shown in Fig. 6 of the drawings.

The top of each of the end portions, A", of the axle I provide with one or more indentations, $a$, and upon said portion of the axle I mount a plate, B, having projecting from its under side a teat, $t$, which enters into the indentation $a$, and from the side edges of the said plate project downward lips $l\ l$, which abut against opposite sides of the axle, said teat and lips serving to effectually prevent the plate from slipping on the axle.

Upon the plate B, I place a wooden block, C, and over this I place clips $c\ c'$, which embrace the axle, plate, and block, and are rigidly secured by the usual clip-ties, $n$, on the under side of the axle, through which clip-ties the screw-threaded ends of the clips pass, and are provided with nuts in the usual manner.

The plates B project horizontally part way over the depressed portion of the axle, and the projecting portion of said plate is provided with shackle-eyes $o'\ o'$, adapted to receive between them the eye $u$ on the end of the spring S. A bolt, $i$, passing through the eyes $o'\ o'$ and $u$, connects the end of the spring to the plate B. When the spring is thus connected, the end portions thereof hang below the end portions of the axle, and are coiled upward between the shackle-eyes $o'\ o'$ and adjacent portion of the axle, as shown in Fig. 1 of the drawings. It will be observed that by the described form of the spring S and its direct connection with the horizontally-projecting plate B, I hang the body of the vehicle very low on the running-gear, and at the same time dispense with the links which are usually interposed between the ends of the spring and the supporting arms or plates, and which allow the spring to rock more or less laterally and cause the spring-coupling to rattle. The upwardly-curved end portions, S', of the spring afford ample elasticity to the spring, and the direct connection of the same to the plate B obviates the rattling of the coupling of said parts.

I do not confine myself to the use of the detachable plates B, inasmuch as the shackle-eyes $o'$ $o'$ may be welded onto the axle.

Having described my invention, what I claim as new, and desire to secure by Letters Patent, is—

1. The combination, with the axle formed with an abruptly downwardly-deflected main portion, of horizontal projections from the end portions over the deflected main portion, and provided with shackle-eyes at the free ends, and a cross-spring having its end portions below the end portions of the axle and coiled upward between the aforesaid shackle-eyes and adjacent portions of the axle, and terminating with eyes connected directly with the shackle-eyes on the axle by bolts passing through said parts, substantially as set forth and shown.

2. The combination of the axle formed with an abruptly downwardly-deflected main portion, plates clipped onto the top of the end portions of said axle and projecting horizontally over the deflected portion of the axle and provided with shackle-eyes at their free ends, and a cross-spring having its end portions below the end portions of the axle and coiled upward between the shackle-eyes of the aforesaid plates and adjacent portions of the axle and connected to said shackle-eyes, substantially as described and shown.

In testimony whereof I have hereunto signed my name and affixed my seal, in the presence of two attesting witnesses, at Syracuse, in the county of Onondaga, in the State of New York, this 20th day of October, 1886.

EDMUND H. CARPENTER. [L. S.]

Witnesses:
H. P. DENISON,
C. H. DUELL.